(12) United States Patent
Mahmoud et al.

(10) Patent No.: US 8,213,376 B2
(45) Date of Patent: Jul. 3, 2012

(54) OFDMA POWER ALLOCATION METHOD

(75) Inventors: Ashraf S. Hasan Mahmoud, Dhahran (SA); Ali Yaseen Al-Rayyah, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 254 days.

(21) Appl. No.: 12/656,807

(22) Filed: Feb. 17, 2010

(65) Prior Publication Data

US 2011/0199983 A1  Aug. 18, 2011

(51) Int. Cl.
*H04W 4/00* (2009.01)
(52) U.S. Cl. ...................................................... 370/329
(58) Field of Classification Search .................. 370/329, 370/343, 344
See application file for complete search history.

(56) References Cited

U.S. PATENT DOCUMENTS

| | | | |
|---|---|---|---|
| 6,870,808 B1 | 3/2005 | Liu et al. | |
| 7,072,315 B1 | 7/2006 | Liu et al. | |
| 7,146,172 B2 | 12/2006 | Li et al. | |
| 7,257,410 B2 | 8/2007 | Chun et al. | |
| 7,283,498 B2 | 10/2007 | Ro et al. | |
| 7,295,626 B2 | 11/2007 | Chayat | |
| 7,355,960 B2 | 4/2008 | Kang et al. | |
| 7,355,962 B2 | 4/2008 | Li et al. | |
| 7,372,830 B2 | 5/2008 | Jung et al. | |
| 7,768,973 B2 * | 8/2010 | Zhu et al. | 370/329 |
| 7,778,211 B2 * | 8/2010 | Hedayat et al. | 370/310 |
| 7,924,698 B2 * | 4/2011 | Zhu et al. | 370/208 |
| 2006/0078059 A1 * | 4/2006 | Ok et al. | 375/260 |
| 2008/0004029 A1 | 1/2008 | Moilanen | |
| 2008/0019303 A1 | 1/2008 | Baek et al. | |
| 2008/0031190 A1 | 2/2008 | Bae et al. | |
| 2008/0076438 A1 | 3/2008 | Chang et al. | |
| 2008/0101438 A1 | 5/2008 | Lee et al. | |

* cited by examiner

*Primary Examiner* — Derrick Ferris
*Assistant Examiner* — Mohammad Anwar
(74) *Attorney, Agent, or Firm* — Richard C. Litman

(57) ABSTRACT

The OFDMA power allocation method provides for supporting absolute proportional rate constrains for scalable OFDMA systems. Network scheduling procedures implementing the prescribed method can provide absolute guarantees for satisfying the specified rate constrains while maximizing the throughput of the network.

8 Claims, 3 Drawing Sheets

OFDMA POWER ALLOCATION METHOD

BACKGROUND OF THE INVENTION

1. Field of the Invention

The present invention relates generally to electronic communications systems and methods, and particularly to an orthogonal frequency division multiple access (OFDMA) power allocation method.

2. Description of the Related Art

Radio resource management (RRM) procedures for Orthogonal Frequency Division Multiple Access (OFDMA) systems have to consider two main resources in the network: the frequency band and the power. The frequency band is typically divided into a number of sub-channels that must be distributed amongst users. Typically, in OFDMA, multiple user transmitters are transmitted simultaneously on different frequencies in the same time slot to make maximum use of the allocated bandwidth. The different frequencies are referred to as sub-carriers. Sub-carriers may be grouped together to form sub-channels. The sub-carriers in a given sub-channel may be adjacent frequencies, or may be grouped together using other criteria. Scalable OFDMA is the OFDMA mode that is used in Wi-MAX. Scalability is achieved by adjusting the FFT size while fixing the sub-carrier frequency spacing at 10.94 kHz.

The RRM must also assign a specific amount of transmit power for each of the allocated sub-channels so that the sum of all power allocations does not exceed the total available power budget for the system. The process of allocating the sub-channels and power assignments is referred to in the literature as the sub-channel (or sub-carrier) power allocation problem for OFDMA systems. The RRM procedure performing this allocation problem plays a central role in the performance of the network. Modern wireless air interface technologies, such mobile WiMAX and Long-Term Evolution (LTE), depend heavily on such procedures to provide their high-speed data services.

Thus, an OFDMA power allocation method solving the aforementioned problems is desired.

SUMMARY OF THE INVENTION

The OFDMA power allocation method provides a means for supporting absolute proportional rate constrains for scalable OFDMA systems. Network scheduling procedures implementing the prescribed method can provide absolute guarantees for satisfying the specified rate constrains while maximizing the throughput of the network.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
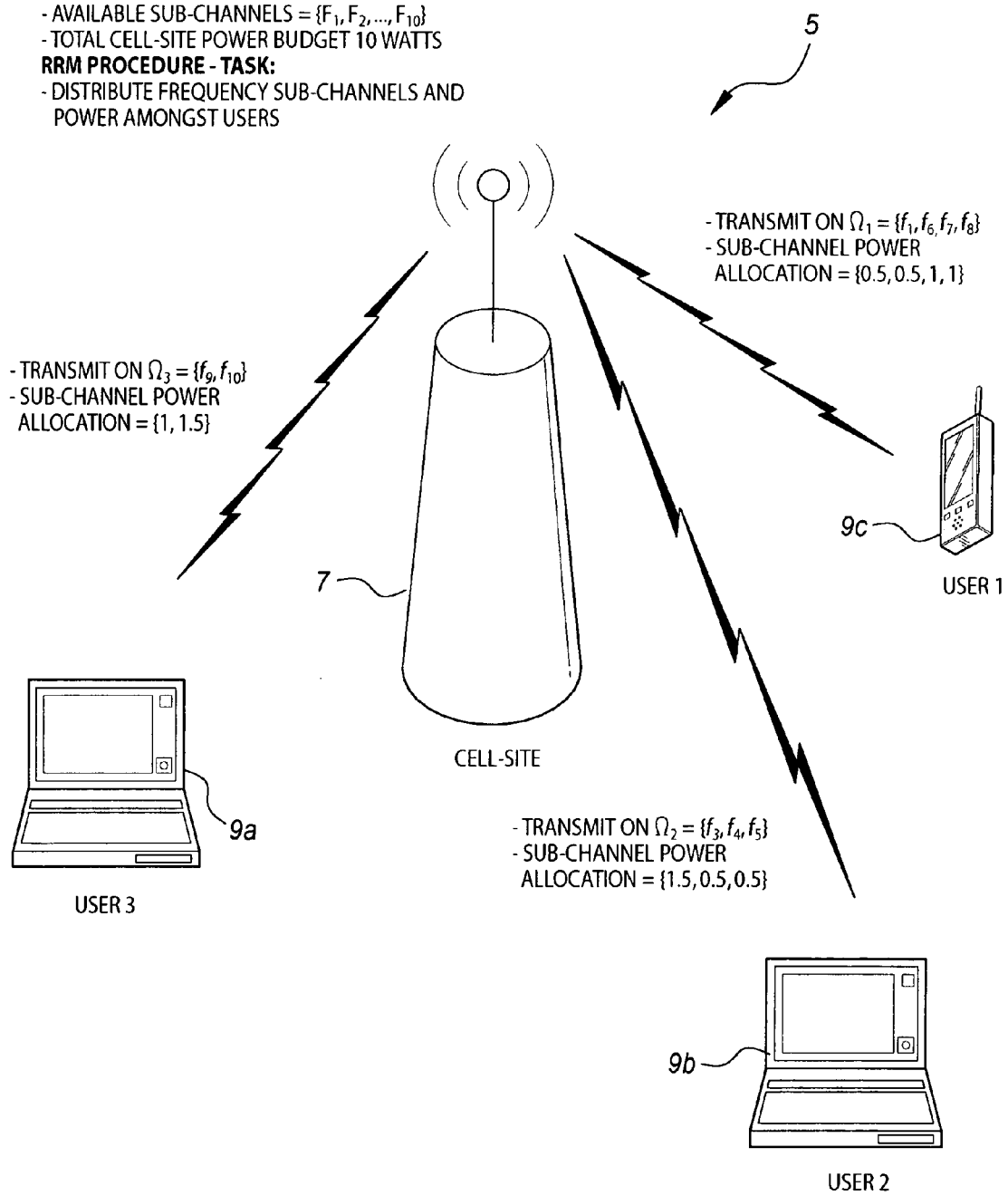
FIG. 1 is a block diagram of a typical wireless communication system configuration managed by the OFDMA power allocation method according to the present invention.

The OFDMA power allocation method provides RRM 5 in communications systems, such as the wireless communication system shown in FIG. 1, which illustrates a hypothetical scenario where the RRM 5 manages the frequency sub-channels denoted by $\{f_1, f_2, \ldots, f_{10}\}$ communicating to cell-site 7, and the total cell-site power budget of 10 Watts. As shown in FIG. 1, user 1 has a wireless device 9c allocated the sub-channel set $\Omega_1 = \{f_1, f_6, f_7, f_8\}$ where the RRM decides to use 0.5 Watts, 0.5 Watts, 1 Watt, and 1 Watt, respectively, on the sub-channels in $\Omega_1$. This means that the total transmit power allocated for user 1 is equal to 2 Watts. For user 2's wireless device 9b, the allocated sub-channels are given by $\Omega_2 = \{f_3, f_4, f_5\}$, and the corresponding transmit powers are 1.5 Watts, 0.5 Watts, and 0.5 Watts, respectively. Lastly, for user 3's device 9a, $\Omega_3 = \{f_9, f_{10}\}$ and the corresponding transmit powers are 1 Watt, and 1.5 Watts, respectively.

This means the total transmit powers for user 2 and user 3 are 2.5 Watts each. Therefore, the total utilized power budget is 2+2.5+2.5=7 Watts. In this scenario, the RRM procedure does not utilize the sub-channel $f_2$, nor does it use all the available transmit power of 10 Watts. The number of assigned sub-channels, their quality, and the amount of allocated transmit power are all determined by the user's bit rate.

Since the channel conditions change with time, the process of allocating the sub-channels and the power assignment may be done by an algorithm on a frame-by-frame basis in order to satisfy some prescribed criteria. Typical criteria that are of interest for network operators and system designers are: (1) to maximize the overall system throughput, and (2) to satisfy the quality of service (QoS) guarantees promised for the users.

Let the overall system frequency bandwidth be divided into N sub-channels, and let there be K users to serve. Furthermore, let $H_{n,k}$ denote the $n^{th}$ sub-channel power gain relative to noise power as received by the $k^{th}$ user, where $n=1, 2, \ldots, N$, and $k=1, 2, \ldots, K$. The RRM algorithm typically distributes the N sub-channels amongst the K users using a typical sub-channel allocation algorithm or some derivative algorithm. The sub-channel allocation algorithm determines the set of sub-channels, denoted by $\Omega_k$, that is allocated for the $k^{th}$ user where $k=1, 2, \ldots, K$. The RRM procedure must now utilize the sub-channel allocations $\Omega_k$'s and the channel power gain information $H_{k,n}$, and compute the corresponding sub-channel power allocation $p_{n,k}$ for every $H_{n,k}$. The power allocations should maximize the overall network throughput as specified by:

$$\max_{p_{k,n}} \sum_{k=1}^{K} \sum_{n \in \Omega_k} \frac{1}{N} \log_2(1 + p_{k,n} H_{k,n}) \qquad (1)$$

subject to the following constraints:

$$\sum_{k=1}^{K} \sum_{n \in \Omega_k} p_{k,n} \leq P_{total} \text{ and } p_{k,n} \geq 0 \qquad (2)$$

$\Omega_k$ are disjoint for all $k$, and $$\Omega_1 \cup \Omega_2 \cup \ldots \cup \Omega_K \subseteq \{1, 2, \ldots N\} \qquad (3)$$

$$\text{and finally, } \frac{R_1}{\gamma_1} = \frac{R_2}{\gamma_2} = \ldots = \frac{R_K}{\gamma_K} \qquad (4)$$

where $R_k$ is the $k^{th}$ user bit rate after the allocation process is completed, and is computed by:

$$R_k = \sum_{n \in \Omega_k} \frac{1}{N} \log_2(1 + p_{k,n} H_{k,n}) \quad (5)$$

Figure 2:
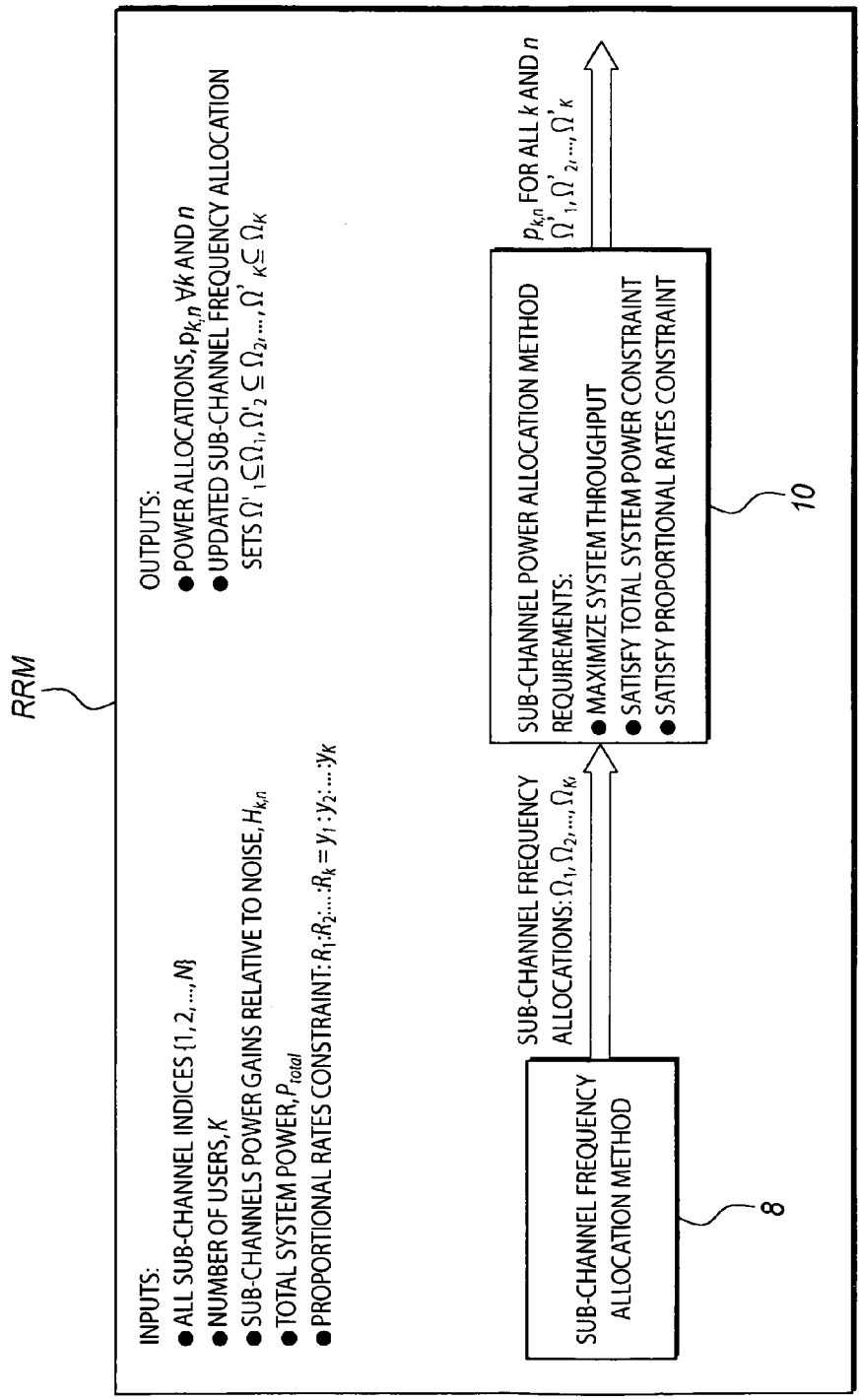
FIG. 2 is a block diagram of a radio resource management system including the OFDMA power allocation method according to the present invention.

The constants $\gamma_1, \gamma_2, \ldots, \gamma_k$ in (4) are the proportional rates constraint. The proportional rates constraint is set by the operator, depending on the specified QoS parameters promised for the users. In other words, the proportional rates constraint specifies the relative bit rates enjoyed by the users. The constraint in (2) is simply that the sum of all power allocations be less or equal to the total system power, $P_{total}$ and that, of course, each allocation $p_{k,n}$ be a positive quantity. The constraint in (3) emphasizes that the allocated sets of sub-channels be all disjoint and that their union is equal to the overall set of all sub-channel indices $\{1, 2, \ldots, N\}$. The RRM procedure must find the sub-channel power allocations, $p_{k,n}$ for all k and all n, so that the overall system throughput specified by (1) is maximized, and so that the total system power constraint and rate proportional constraint are satisfied, as specified by (2) and (4). The RRM procedure is summarized in FIG. 2, which depicts RRM frequency sub-channel allocation 8, and RRM sub-channel power allocation 10. The OFDMA power allocation method 10 performs the sub-channel power allocation, calculating the required power allocation $p_{k,n}$ for a particular sub-channel. Moreover, the OFDMA power allocation method can also modify the allocated sets of sub-channels $\Omega_k$'s by dropping some unwanted sub-channels. This is reflected by the output $\Omega_k'$, which should be a partial set from the original $\Omega_k$.

The above power allocation problem has been addressed in the literature for the field. However, the OFDMA power allocation method provides higher capacity than methods known to the inventors, and, more importantly, provides absolute or hard proportional rate guarantees, as opposed to soft guarantees. This means that the method developed herein satisfies the constraint (4) in the strictest sense.

A conventional method for solving the optimization problem specified by (1) and the constraints (2), (3), and (4), is to use the Lagrange multipliers, as in (2), and that are given by:

$$L = \sum_{k=1}^{K} \sum_{n \in \Omega_k} \frac{1}{N} \log_2(1 + p_{k,n} H_{k,n}) + \lambda_1 \left( \sum_{k=1}^{K} \sum_{n \in \Omega_k} p_{k,n} - P_{total} \right) + \quad (6)$$

$$\sum_{k=2}^{K} \lambda_k \left( \sum_{n \in \Omega_1} \frac{1}{N} \log_2(1 + p_{1,n} H_{1,n}) - \frac{\gamma_1}{\gamma_k} \sum_{n \in \Omega_k} \frac{1}{N} \log_2(1 + p_{k,n} H_{k,n}) \right)$$

where the constants (Lagrange multipliers) $\lambda k$ for $k=2, 3, \ldots, K$ are to be determined. To maximize (1), we differentiate (6) with respect to the variable of interest, $p_{k,n}$, and set the derivative to zero. This yields:

$$\frac{1}{\gamma_1} \frac{N_1}{N} \left( \log_2 \left( 1 + H_{1,1} \frac{P_{1,total} - V_1}{N_1} \right) + \log_2 W_1 \right) = \quad (7)$$

$$\frac{1}{\gamma_k} \frac{N_k}{N} \left( \log_2 \left( 1 + H_{k,1} \frac{P_{k,total} - V_k}{N_k} \right) + \log_2 W_k \right)$$

for $k=2, 3, \ldots, K$. The term $P_{k,total}$ is the total power allocated to the $k^{th}$ user and should be given by:

$$P_{k,total} = \sum_{n=1}^{N_k} p_{k,n} \quad (8)$$

The constants $V_k$ and $W_k$ are given by:

$$V_k = \sum_{n=2}^{N_k} \frac{H_{k,n} - H_{k,1}}{H_{k,n} H_{k,1}} \quad (9)$$

and $$W_k = \left( \prod_{n=2}^{N_k} \frac{H_{k,n}}{H_{k,1}} \right)^{\frac{1}{N_k}} \quad (10)$$

respectively. The quantities $V_k$ and $W_k$ are a manifestation of the sub-channel frequency allocation procedure and depend only on the allocated sub-channels sets $\Omega_k$ only. The above formulation assumes that the channel power gains for the $k^{th}$ user have been ordered such that $H_{k,1} \leq H_{k,2} \leq \ldots \leq H_{k,N_k}$, where $N_k$ is the number of sub-channels allocated for the $k^{th}$ users. That is, the number of elements in the set $\Omega_k$ is equal to $N_k$. This means the quantity $V_k$ is always positive.

If the relation in (7) is solved for total power allocated for a particular user, $P_{k,total}$, then the power allocation for the individual sub-channels, $p_{k,n}$, for that particular user can be found using:

$$p_{k,1} = \frac{(P_{k,total} - V_k)}{N_k} \quad (11)$$

and $$p_{k,n} = p_{k,1} + \frac{H_{k,n} - H_{k,1}}{H_{k,n} H_{k,1}} \quad (12)$$

The relations (11) and (12) completely specify the final output required by the system, which are the individual power allocations, $p_{k,n}$ for all $k=1, 2, \ldots, K$, and $n \in \Omega_k$. It should be noted that if the power allocation procedure does not want to utilize a particular sub-channel, then the sub-channel is dropped from the corresponding allocated sub-channel frequency set.

The relation in (7) specifies a set of K−1 simultaneous non-linear equations that must be solved for $P_{k,total}$'s (or equivalently the power allocations $p_{k,n}$'s) that achieves the maximum throughput and satisfies the constraints. A simplified version of the equations, i.e., a special case, may be solved, in which the channel power gains $H_{k,n}$ are assumed to be very large and the provided solution does not necessarily satisfy the proportional rates constraint (4) for the general case. However, such a solution may only be valid for systems where the signal level is much higher than that for the noise. The present OFDMA power allocation method solves the original K−1 non-linear equations specified by (7) without making assumptions in regard to the channel power gains. Therefore, the provided solution is valid for general systems, regardless of the noise power level relative to the transmitted signal power. Furthermore, we augment the provided solution with a procedure to ensure that the final output, $p_{k,n}$'s, will also satisfy the proportional rates constraint specified by (4) in the strictest sense.

To solve the K−1 non-linear equations specified by (6), let the quantity $X_k$ be defined as $X_k=1+H_{k,1}(P_{k,total}-V_k)/N_k$, this means the $k^{th}$ user power allocation, $P_{k,total}$ can be computed, given $X_k$, using:

$$P_{k,total} = V_k + \frac{N_k}{H_{k,1}}(X_k - 1) \quad (13)$$

Substituting $X_k$ in (7) and rearranging terms, one can write:

$$(X_i W_i)^{\frac{N_i}{\gamma_i}} = (X_k W_k)^{\frac{N_k}{\gamma_k}}$$

for any i and k=1, 2, ..., K. This mean a particular $X_k$ can be computed using:

$$X_k = \frac{(X_i W_i)^{\frac{N_i \gamma_k}{\gamma_i N_k}}}{W_k} \quad (14)$$

The relation (14) relates any two quantities $X_i$ and $X_k$. In other words, it is sufficient to find one quantity $X_i$ for some i=1, 2, ..., K, and then all the rest of $X_k$'s where k≠i can be computed using (14). To solve for $X_i$, we use (14) and invoke the total power constraint specified by (2) to yield the following:

$$\sum_{k=1}^{K}\left[\left(\frac{N_k}{H_{k,1}}\right)\left(\frac{(X_i W_i)^{\frac{N_i \gamma_k}{\gamma_i N_k}}}{W_k} - 1\right) + V_k\right] - P_{total} = 0 \quad (15)$$

The relation (15) specifies one non-linear equation in $X_i$ that can be solved using conventional methods known in the literature, or simply by utilizing Matlab's fsolve routine. The algorithm then utilizes (14) and (13) to compute all $X_k$'s and the corresponding total power allocations for the users. Finally, to calculate the individual power allocations for sub-channels $p_{k,n}$, the relations (11) and (12) are utilized. Unfortunately, a solution for (7) and for (15), since it is based on (7), can not be guaranteed to exist for any given set of sub-channel frequency allocations. This means the set of sub-channels, $\Omega_k$'s, produced by the sub-channel frequency allocation method may not be utilized as is. The OFDMA power allocation method includes a procedure for modifying the $\Omega_k$'s by dropping the weak channels until (7), or equivalently (15), has a valid solution. This procedure guarantees that the valid solution found optimizes the system throughput, as specified by (1), meets the constraints (2), (3) and satisfies the proportional rates constraint (4) in the strictest sense.

Figure 3:
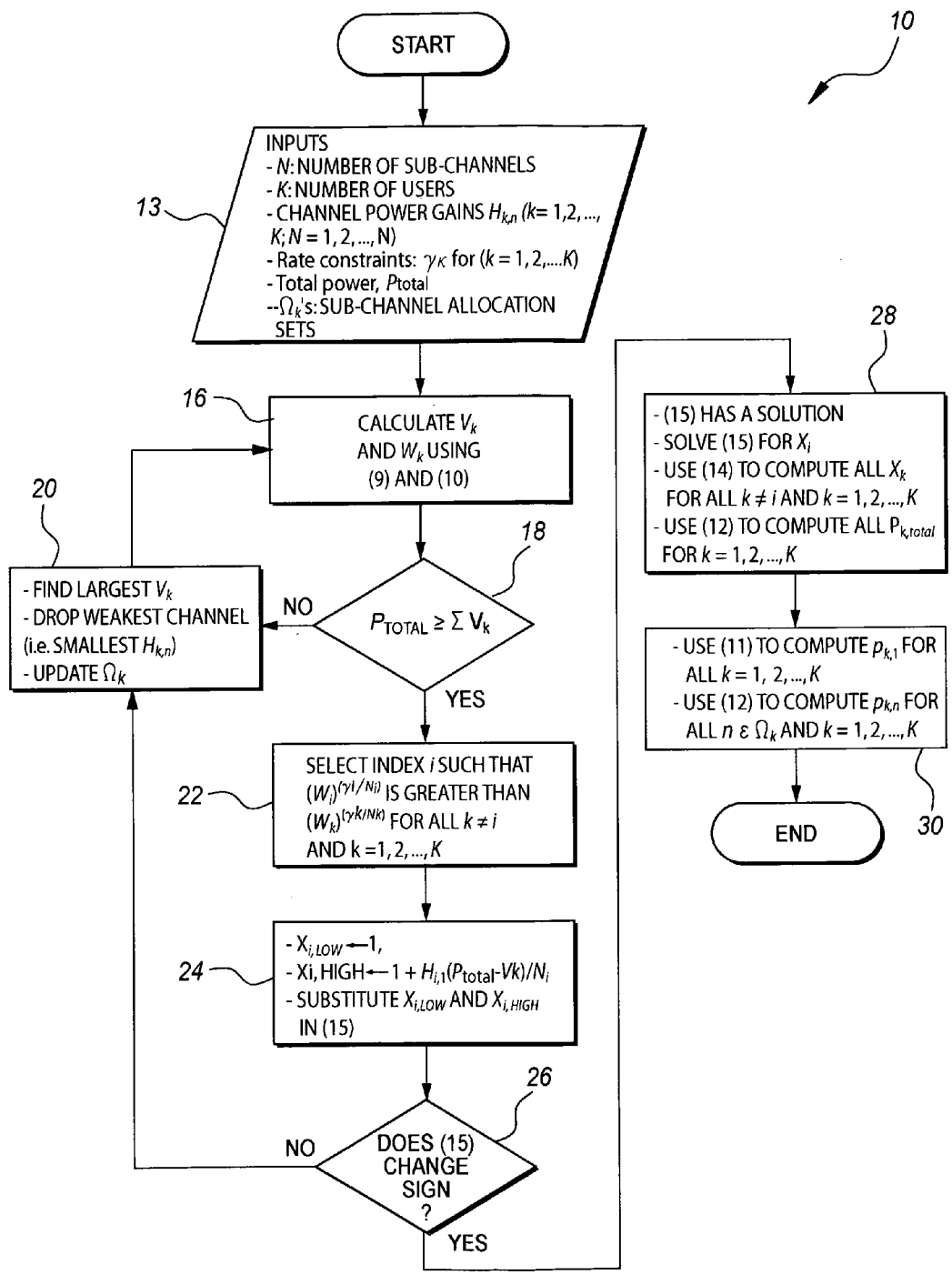
FIG. 3 is a flowchart showing steps in the OFDMA power allocation method according to the present invention.

The proposed method is depicted in the flowchart of FIG. 3. The key observation related to existence of a solution is the fact that for the given $k^{th}$ user, its sub-channel frequency allocations, $\Omega_k$, should be such that the corresponding $V_k$ is smaller to or equal than its final total user power allocation $P_{k,total}$. This is evident from relation (11). It follows that quantity $X_k$ should be always greater than 1. Therefore, to ensure the existence of a valid solution, the method must first ensure that $$\sum_{k=1}^{K} V_k \leq P_{total},$$

and using the iterative procedure, we ensure that $V_k$ is less than or equal to the corresponding total user power allocation $P_{k,total}$. The iterative procedure is as follows.

As shown in step 13 of FIG. 3, the inputs are acquired, including the sub-channel frequency allocations sets $\Omega_k$ for k=1, 2, ..., K. At step 16, Equations (9) and (10) are used to compute the corresponding $V_k$ and $W_k$, respectively.

At step 18, check the following inequality:

$$\sum_{k=1}^{K} V_k \leq P_{total}.$$

If the inequality is not satisfied, go to step 20, otherwise go to step 22.

At step 20, select the set $\Omega_k$ that correspond to the largest $V_k$ where k=1, 2, ..., K; and drop the channel with the smallest power gain $H_{k,n}$. Update set $\Omega_k$, then recalculate the corresponding $V_k$ and $W_k$.

At step 22, select the user index i such that the corresponding $$(W_i)^{\frac{N_i}{\gamma_i}}$$

is greater than or equal to $$(W_k)^{\frac{N_k}{\gamma_k}}$$

for all k≠i and k=1, 2, ..., K. As shown in step 24, the theoretical possible range for $X_i$ (refer to the definition used for (13)) is all values between 1 and $1+H_{i,1}(P_{total}-V_i)/N_i$. At step 26, check if (15) has different signs when $X_i$ assumes the two extreme values of its range. If (15) has a sign change, then there is a valid solution $X_i$ between the corresponding extreme values, and then go to step 28. Otherwise, we need to update the sub-channel frequency allocation sets, so go to step 20.

At steps 28 and 30, a valid solution for (15) is guaranteed. Solve (15) for $X_i$.

Use (14) to compute all $X_k$ for k≠i and k=1, 2, ..., K.

Compute the corresponding total user power allocation $P_{k,total}$ for k=1, 2, ..., K using (13).

For the $k^{th}$ user where k=1, 2, ..., K, compute the individual sub-channel power allocations $p_{k,n}$ using (11) and (12) for n∈$\Omega_k$.

The above iterative procedure specified in the aforementioned procedure ensures that the sub-channel frequency allocation sets are updated so that a valid solution for (15) can be found. This solution maximizes the system throughput and also guarantees that the provided users' rates $R_k$'s satisfy the proportional rates constraint such that $R_1:R_2:R_3:\ldots R_K=\gamma_1:\gamma_2:\gamma_3:\ldots\gamma_K$.

In practice, the OFDMA power allocation may be implemented by various hardware configurations, depending upon the particular application and the size of the communications network. Generally, the method applies to a wireless communications network having a central communications hub or base station and a plurality of subscribers or users accessing the network remotely. The base station implements the method to determine power allocation according to the relative nearness or farness of the remote user, the signal-to-noise ratio, the type of communication (digital video, VoIP, FTP, etc.), the proportional rate constraint for the type of communication (the ratio of the bit rate permitted the user to the quality of service or guaranteed bit rate for the type of communication), etc.

In a cellular telephone base station, e.g., the station has a receiving antenna(s) for receiving multiple signals, which are decoded by conventional receiver hardware, processed by conventional hardware to filter noise and amplify or reduce power accordingly, and processed by appropriate port according to the type of protocol. Data from the multiple subscriber access requests may be processed by a microcontroller, digital signal processor, microprocessor, custom-built application specific integrated circuit, or other dedicated electronic circuits configured or programmed to periodically determine power allocation according to the current subscriber access requests. The base station then transmits the power allocation and other parameters to the subscriber units (which may be in the header of at least one frame of digital data transmitted on a downlink from the base station to the subscribers/users of the wireless communications system), which automatically adjust their transmitter parameters to the base station's allocations.

Alternatively, for a large network with numerous users or subscriber's, the method may be implemented by one or more computers at the base station that have been programmed in software to perform the calculations required by the method. The computer may be any computing device, e.g., a personal computer. The computer may have a display for displaying a user interface. A processor (i.e., a central processing unit or microprocessor) executes computer program or software instructions loaded into an area of main memory. The program or software may be stored in RAM or ROM memory. The display, the processor, main memory, and RAM or ROM memory are connected by a data bus. The software may be stored on any computer readable media, including magnetic media (a hard disk drive, a floppy disk, a magnetic tape, etc.), an optical disk (a DVD, DVD-RAM, CD-ROM, CD-R/RW, laser disk, etc.), a magneto-optical disk, or semiconductor memory (RAM or ROM). The computer(s) may be connected to the radio receiving/transmitting hardware by any suitable cabling, ports, USB or RS-232 devices or modems, or other suitable computer/transceiver interface.

It is to be understood that the present invention is not limited to the embodiment described above, but encompasses any and all embodiments within the scope of the following claims.

We claim:

1. An OFDMA power allocation method for managing power in a wireless communication system having a base station and a plurality of wireless users, the system implementing scalable orthogonal frequency division multiple access with quality of service proportional rate constraints, the method comprising the steps of:
    distributing N sub-channels among K users of the wireless communications system;
    receiving wireless requests at the base station for access to the wireless communications from the users;
    assessing power gain relative to noise for each sub-channel allocated to each user;
    iteratively computing sub-channel power allocations for each user based on the proportional rate constraints and the channel power gain information, thereby strictly satisfying the proportional rate constraints; and
    transmitting the power allocations to each of the users requesting access;
    wherein, said step of iteratively computing the sub-channel power allocations for each user comprises the steps of:
    inputting N number of sub-channels, K number of users, and channel power gains $H_{k,n}$ (k=1, 2, ..., K, and n=1, 2, ..., N);
    inputting rate constraints $\gamma_k$ for (k=1, 2, ..., K);
    inputting total power $P_{total}$;
    inputting $\Omega_k$'s subchannel allocation sets;
    calculating $V_k$ constants using the equation $$V_k = \sum_{n=2}^{N_k} \frac{H_{k,n} - H_{k,1}}{H_{k,n} H_{k,1}};$$

calculating the $W_k$ constants using the equation $$W_k = \left( \prod_{n=2}^{N_k} \frac{H_{k,n}}{H_{k,1}} \right)^{\frac{1}{N_k}};$$

determining whether the sum of the calculated $V_k$ constants is less than or equal to the total power $P_{total}$, and if this is not the case then performing the steps of:
    (i) selecting a set of $\Omega_k$ that corresponds to the largest $V_k$
    (ii) dropping the weakest channel from $\Omega_k$, thereby updating the sub-channel frequency allocation;
    (iii) recalculating the $V_k$ and $W_k$;
    (iv) repeating (i) through (iii) until the sum of $V_k$'s is less or equal to $P_{total}$;
otherwise, if the sum of the calculated $V_k$ constants is less than or equal to the total power $P_{total}$, then performing the steps of:
selecting a user index such that a corresponding $$(W_i)^{\frac{N_i}{\gamma_i}}$$

is greater than or equal to $$(W_k)^{\frac{N_k}{\gamma_k}}$$

for all k≠i and k=1, 2, ..., K;
    assigning the value 1 to an $X_{i,Low}$ and assigning the value $1+H_{i,1}(P_{total}-V_k)/N_i$ to an $X_{i,High}$;
    determining whether the equation $$\sum_{k=1}^{K} \left[ \left( \frac{N_k}{H_{k,1}} \right) \left( \frac{(X_i W_i)^{\frac{N_i \gamma_k}{\gamma_i N_k}}}{W_k} - 1 \right) + V_k \right] - P_{total} = 0$$

changes sign and recalculating the $\Omega_k$, $V_k$, $W_k$ and $P_{total}$ if the sign has not changed, otherwise solving $$\sum_{k=1}^{K} \left[ \left( \frac{N_k}{H_{k,1}} \right) \left( \frac{(X_i W_i)^{\frac{N_i \gamma_k}{\gamma_i N_k}}}{W_k} - 1 \right) + V_k \right] - P_{total} = 0$$

for $X_i$;

computing all $X_k$ for $k \neq i$ and $k=1, 2, \ldots, K$ using the equation $$X_k = \frac{(X_i W_i)^{\frac{N_i \gamma_k}{\gamma_i N_k}}}{W_k};$$

computing $P_{k,1}$ for all $k=1, 2, \ldots, K$, using the equation $$p_{k,1} = \frac{(P_{k,total} - V_k)}{N_k};$$

and computing $p_{k,n}$ for all $k=1, 2, \ldots, K$, and $n \in \Omega_k$ using the equation $$p_{k,n} = p_{k,1} + \frac{H_{k,n} - H_{k,1}}{H_{k,n} H_{k,1}}.$$

2. The OFDMA power allocation method according to claim 1, wherein the proportional rate constraints are set by an operator of the communications system, the proportional rate constraints being based on specified Quality of Service parameters promised to the users.

3. The OFDMA power allocation method according to claim 1, wherein a sum of all said power allocations is equal to total power allocated to the communication system, and each said power allocation is a positive quantity.

4. The OFDMA power allocation method according to claim 1, wherein the allocated sets of sub-channels are all disjoint and the union of the allocated sets is equal to an overall set of all indices $\{1, 2, \ldots, N\}$ of all of said sub-channels.

5. The OFDMA power allocation method according to claim 1, wherein throughput is maximized by specifying by an optimization formulation of:

$$\max_{p_{k,n}} \sum_{k=1}^{K} \sum_{n \in \Omega_k} \frac{1}{N} \log_2(1 + p_{k,n} H_{k,n}).$$

6. The OFDMA power allocation method according to claim 5, further comprising applying Lagrange multipliers to said optimization formulation as follows:

$$L = \sum_{k=1}^{K} \sum_{n \in \Omega_k} \frac{1}{N} \log_2(1 + p_{k,n} H_{k,n}) + \lambda_1 \left( \sum_{k=1}^{K} \sum_{n \in \Omega_k} p_{k,n} - P_{total} \right) +$$

-continued $$\sum_{k=2}^{K} \lambda_k \left( \sum_{n \in \Omega_1} \frac{1}{N} \log_2(1 + p_{1,n} H_{1,n}) - \frac{\gamma_1}{\gamma_k} \sum_{n \in \Omega_k} \frac{1}{N} \log_2(1 + p_{k,n} H_{k,n}) \right).$$

7. The OFDMA power allocation method according to claim 6, further comprising the step of differentiating said optimization formulation including said Lagrange multipliers with respect to $p_{k,n}$ and setting a resultant derivative to zero, a resultant solution to said derivative being defined by the formulation:

$$\frac{1}{\gamma_1} \frac{N_1}{N} \left( \log_2 \left( 1 + H_{1,1} \frac{P_{1,total} - V_1}{N_1} \right) + \log_2 W_1 \right) =$$
$$\frac{1}{\gamma_k} \frac{N_k}{N} \left( \log_2 \left( 1 + H_{k,1} \frac{P_{k,total} - V_k}{N_k} \right) + \log_2 W_k \right),$$

wherein:

$$P_{k,total} = \sum_{n=1}^{N_k} p_{k,n}.$$

8. An OFDMA power allocation method for managing power in a wireless communication system having a base station and a plurality of wireless users, the system implementing scalable orthogonal frequency division multiple access with quality of service proportional rate constraints, the method comprising the steps of:

distributing N sub-channels among K users of the wireless communications system;

receiving wireless requests at the base station for access to the wireless communications from the users;

assessing power gain relative to noise for each sub-channel allocated to each user;

iteratively computing sub-channel power allocations for each user based on the proportional rate constraints and the channel power gain information, thereby strictly satisfying the proportional rate constraints; and transmitting the power allocations to each of the users requesting access, wherein throughput is maximized by specifying by an optimization formulation of:

$$\max_{p_{k,n}} \sum_{k=1}^{K} \sum_{n \in \Omega_k} \frac{1}{N} \log_2(1 + p_{k,n} H_{k,n}),$$

wherein k is an integer representing a $k^{th}$ user such that $k=1, 2, 3, \ldots, K$, $\Omega_k$ represents a set of the sub-channels allocated for the $k^{th}$ user, n is an integer such that $n=1, 2, 3, \ldots N$, $H_{k,n}$ represents channel power gain information for the $k^{th}$ user for the $n^{th}$ sub-channel, and $p_{k,n}$ represents sub-channel power allocation for each said corresponding $H_{k,n}$.

* * * * *